United States Patent
Jeon

(10) Patent No.: US 11,294,507 B2
(45) Date of Patent: Apr. 5, 2022

(54) TOUCH SENSING DEVICE AND METHOD THEREOF

(71) Applicant: Silicon Works Co., Ltd., Daejeon (KR)

(72) Inventor: Yeong Il Jeon, Daejeon (KR)

(73) Assignee: Silicon Works Co., Ltd, Daejeon (KR)

( * ) Notice: Subject to any disclaimer, the term of this patent is extended or adjusted under 35 U.S.C. 154(b) by 0 days.

(21) Appl. No.: 17/194,718

(22) Filed: Mar. 8, 2021

(65) Prior Publication Data
US 2021/0294478 A1 Sep. 23, 2021

(30) Foreign Application Priority Data
Mar. 18, 2020 (KR) .................. 10-2020-0033121

(51) Int. Cl.
*G06F 3/041* (2006.01)
(52) U.S. Cl.
CPC ........ *G06F 3/04182* (2019.05); *G06F 3/0414* (2013.01)
(58) Field of Classification Search
CPC ............................ G06F 3/0414; G06F 3/04182
USPC ................................................. 345/173, 174
See application file for complete search history.

(56) References Cited

U.S. PATENT DOCUMENTS

| | | | | |
|---|---|---|---|---|
| 2012/0001859 | A1* | 1/2012 | Kim ........................ | G06F 3/044 345/173 |
| 2013/0169561 | A1* | 7/2013 | Park ....................... | G06F 3/0488 345/173 |
| 2015/0160778 | A1* | 6/2015 | Kim ........................ | G06F 3/0445 345/174 |
| 2015/0277609 | A1* | 10/2015 | Jung ................... | G06F 3/041661 345/173 |
| 2016/0098148 | A1* | 4/2016 | Gandra ................. | G06F 3/0416 345/173 |
| 2016/0231857 | A1* | 8/2016 | Kano .................... | G06F 3/04845 |
| 2018/0373381 | A1* | 12/2018 | Kang ....................... | G06F 3/047 |

FOREIGN PATENT DOCUMENTS

KR   10-1399001 B1   5/2014

* cited by examiner

Primary Examiner — Jimmy H Nguyen
(74) Attorney, Agent, or Firm — Polsinelli PC

(57) ABSTRACT

A touch sensing method includes receiving touch sensitivities; grouping and labeling touch sensitivities each having at least a first reference value, among the touch sensitivities; determining validity of touch sensitivities in each group, by using a maximum touch sensitivity and surrounding touch sensitivities in each group; and skipping calculation of touch coordinates when the touch sensitivities are not valid. The determining of validity of touch sensitivities determines that touch sensitivities of a corresponding group are invalid, when at least one of surrounding touch sensitivities is equal to or less than a second reference value.

14 Claims, 5 Drawing Sheets

Touch sensitivity in the first frame(T)

Touch sensitivity in the second frame(T+1)

TOUCH SENSING DEVICE AND METHOD THEREOF

BACKGROUND

1. Technical Field

Various embodiments generally relate to a touch sensing technology, and more particularly, to a touch sensing device and a method thereof capable of improving the accuracy of touch coordinates and avoiding noise.

2. Related Art

In general, a display device which senses a touch includes touch sensors which are disposed in a pixel array of a display panel. The touch sensors may be implemented as capacitive type touch sensors which sense a touch based on a change in capacitance.

A touch panel may be divided into a plurality of sensing areas, and touch sensitivities of the divided sensing areas may be used in calculating touch coordinates.

In the conventional art, when there is a touch at the boundary between sensing areas of the touch panel, only some of the sensing areas may sense the touch with normal sensitivities due to a difference between a touching time and a sensing time.

Therefore, in the conventional art, when there is a touch at the boundary between sensing areas, touch coordinates may be calculated using only touch sensing values of some sensing areas, and thus, the accuracy of the touch coordinates may be degraded. Also, in the conventional art, since the accuracy of a sensitivity of a touch may be degraded due to the introduction of noise, a technology capable of avoiding noise is required.

SUMMARY

Various embodiments are directed to a touch sensing device and a method thereof capable of improving the accuracy of touch coordinates by determining the validity of a touch using touch sensitivities of surrounding sensing areas and avoiding noise.

In an embodiment, a touch sensing method may include: receiving touch sensitivities; grouping and labeling touch sensitivities each having at least a first reference value, among the touch sensitivities; determining validity of touch sensitivities in each group, by using a maximum touch sensitivity and surrounding touch sensitivities in each group; and skipping calculation of touch coordinates when the touch sensitivities are not valid. The determining of validity of touch sensitivities may determine that touch sensitivities of a corresponding group are invalid, when at least one of surrounding touch sensitivities is equal to or less than a second reference value.

The touch sensing method may further include changing a touch sensing frequency by determining that noise is introduced, when touch sensitivities are determined to be invalid in successive frames.

In an embodiment, a touch sensing device may include: a readout circuit configured to sense touch inputs of a touch sensing panel, and convert values of the touch inputs into touch sensitivities; and a controller configured to receive the touch sensitivities, group and label touch sensitivities, each having at least a first reference value, among the touch sensitivities in each region, determine validity of the touch sensitivities by using surrounding touch sensitivities of a maximum touch sensitivity in each region, and skip calculation of touch coordinates when the touch sensitivities are not valid. When determining validity of the touch sensitivities, the controller may determine that touch sensitivities of a corresponding region are invalid, in the case where at least one of the surrounding touch sensitivities is equal to or less than a second reference value.

According to the embodiments, since touch coordinates are calculated by determining the validity of a touch using touch sensitivities of surrounding sensing areas, the accuracy of touch coordinates may be improved even when there is a touch at the boundary between sensing areas.

Also, when touches on successive frames are determined to be invalid, a touch sensing frequency is changed by determining that noise is introduced, and thus, it is possible to avoid an influence by noise.

DETAILED DESCRIPTION

Embodiments may provide a touch sensing device and a method thereof capable of improving the accuracy of touch coordinates by determining the validity of a touch and avoiding an influence by noise.

The embodiments may be applied to a touch sensing device which sequentially senses sensing areas of a touch sensing panel. For example, a method of sensing the touch sensing panel may include a method of sequentially sensing areas of the touch sensing panel from top to down, from down to top, from left to light and from light to left.

In the embodiments, grouping may be defined as an operation of dividing regions, expected as touch candidates, into respective groups by using touch sensitivities, and labeling may be defined as an operation for identifying the respective groups. In the embodiments, sensing areas whose touch sensitivities are equal to or greater than a first reference value may be expected as a touch candidate, and each group may be identified by allocating a symbol to the group. A touch sensitivity may be understood as a touch sensing value.

In describing embodiments, when it is determined that the detailed description of the known related art may obscure the gist of the disclosure, the detailed description thereof will be omitted. It is also to be understood that the terms first, second, etc. may be used to describe various components, but the components are not limited by the terms, and the terms may be used to distinguish one component from another.

Figure 1:
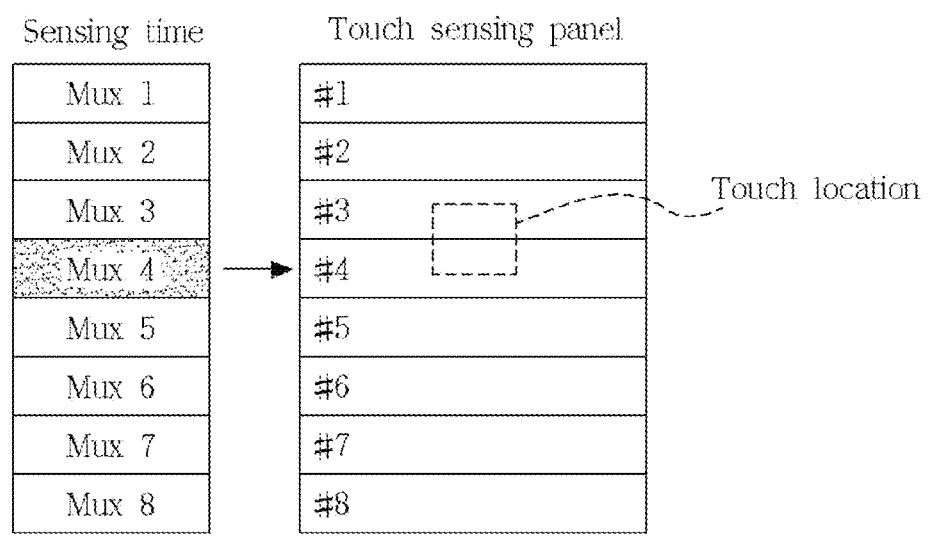
FIG. 1 is a diagram to assist in the explanation of an operation of sequentially sensing areas of a touch sensing panel.

FIG. 1 is a diagram to assist in the explanation of an operation of sequentially sensing areas of a touch sensing panel.

Referring to FIG. 1, the touch sensing panel may be divided into a plurality of sensing areas #1 to #8 for sensing a touch. A touch sensing device may sequentially sense a touch on the sensing areas #1 to #8 of the touch sensing panel.

Each of the sensing areas #1 to #8 of the touch sensing panel may include a multiplexer for sensing a touch. The multiplexer may include a plurality of touch sensors.

For example, the touch sensing device may sequentially sense a touch on the first to eighth sensing areas #1 to #8 by sequentially driving first to eighth multiplexers Mux 1 to Mux 8 of the touch sensing panel.

When the fourth multiplexer Mux 4 senses a touch on the fourth sensing area #4, in the case where a touch location occurs at the boundary between the third sensing area #3 and the fourth sensing area #4, a touch sensitivity of a touch on the third sensing area #3 may not be accurate.

In this way, in the case where a touch occurs at the boundary between the third sensing area #3 and the fourth sensing area #4 at a time for sensing a touch on the fourth sensing area #4, the touch on the third sensing area #3 may not be sensed, and only the touch on the fourth sensing area #4 may be sensed.

Figure 2:
FIG. 2 is a diagram to assist in the explanation of a touch sensing method in accordance with an embodiment.

FIG. 2 is a diagram to assist in the explanation of a touch sensing method in accordance with an embodiment.

Referring to FIG. 2, the embodiment may determine the validity of a touch by checking touch sensitivities of surrounding sensing areas based on a sensing area having a maximum touch sensitivity MAX in a region expected as a touch candidate. As an example, the embodiment may check touch sensitivities of surrounding sensing areas, that is, upper, lower, left and right sensing areas, of a sensing area having a maximum touch sensitivity MAX, may determine that a touch is valid, when all the touch sensitivities of the surrounding sensing areas have positive values, and may determine that a touch is invalid, when even one of the touch sensitivities of the surrounding sensing areas has a negative value.

In touch sensitivities of a first frame T illustrated in FIG. 2, a maximum touch sensitivity MAX is 152, and touch sensitivities of upper, lower, left and right surrounding sensing areas are −23, 33, 125 and 20, respectively. The embodiment may determine that the touch sensitivities of the first frame T are invalid, when the touch sensitivity of the upper sensing area based on a sensing area having the maximum touch sensitivity MAX is checked as a negative value.

The embodiment does not calculate touch coordinates of the touch on the first frame T when it is determined that the touch sensitivities of the first frame T are not valid. Thereafter, touch sensitivities of a second frame T+1 may be received, and it may be determined whether the touch sensitivities of the second frame T+1 are valid. The second frame T+1 may be defined as a frame which is successive to the first frame T.

In the touch sensitivities of the second frame T+1 illustrated in FIG. 2, a maximum touch sensitivity MAX is 159, and touch sensitivities of upper, lower, left and right surrounding sensing areas are 12, 133, 133 and 15, respectively. The embodiment may determine that the touch sensitivities of the second frame T+1 are valid, when all the touch sensitivities of the upper, lower, left and right surrounding sensing areas based on a sensing area having the maximum touch sensitivity MAX are checked as positive values. That is to say, in this case, it may be determined that the touch is valid.

In the case where it is determined that the touch sensitivities of the second frame T+1 are valid, the embodiment may calculate touch coordinates using the touch sensitivities of the second frame T+1.

In this way, the embodiment may determine the validity of touch sensitivities of sensing areas, expected as a touch candidate, by using a maximum touch sensitivity among the touch sensitivities and touch sensitivities of surrounding sensing areas, and may calculate touch coordinates using touch sensitivities that are determined to be valid, whereby it is possible to improve the accuracy of the touch coordinates.

Figure 3:
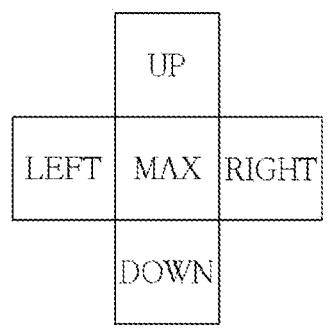
FIG. 3 is a diagram to assist in the explanation of determining the validity of touch sensitivities in the touch sensing method in accordance with the embodiment.

FIG. 3 is a diagram to assist in the explanation of determining the validity of touch sensitivities in the touch sensing method in accordance with the embodiment.

Referring to FIG. 3, the embodiment may determine the validity of touch sensitivities of sensing areas expected as a touch candidate by using a maximum touch sensitivity MAX among the touch sensitivities of the sensing areas expected as the touch candidate and touch sensitivities of upper (UP), lower (DOWN), left (LEFT) and right (RIGHT) surrounding sensing areas.

The touch sensitivities of the surrounding sensing areas may be set as touch sensing values of touch sensors of sensing areas disposed at upper (UP), lower (DOWN), left (LEFT) and right (RIGHT) sides of a touch sensor of a sensing area having the maximum touch sensitivity MAX.

In this way, the embodiment may calculate touch coordinates by determining the validity of touch sensitivities by using the maximum touch sensitivity MAX and the touch sensitivities of the upper (UP), lower (DOWN), left (LEFT) and right (RIGHT) surrounding sensing areas. Thus, even in the case where a touch occurs at the boundary among the first to eighth sensing areas #1 to #8, the accuracy of touch coordinates may be improved.

Figure 4:
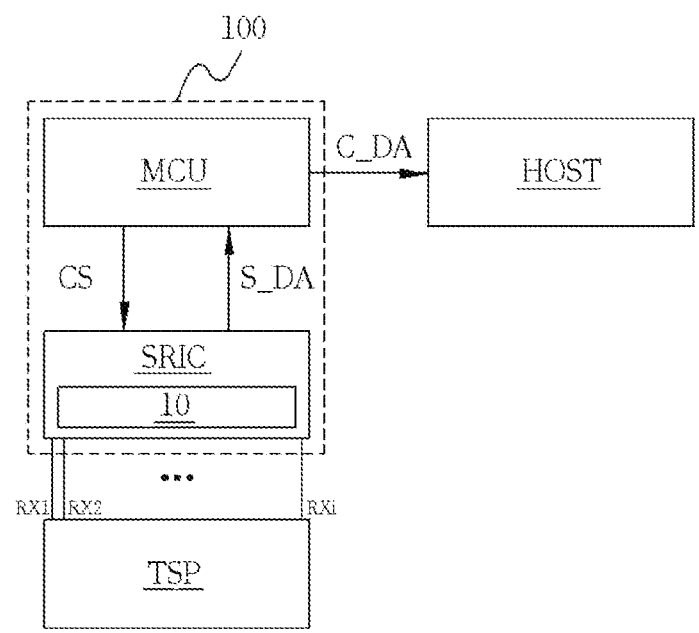
FIG. 4 is a block diagram to assist in the explanation of a touch sensing device in accordance with an embodiment.

FIG. 4 is a block diagram to assist in the explanation of a touch sensing device 100 in accordance with an embodiment.

Referring to FIG. 4, the touch sensing device 100 may include a source driver SRIC and a controller MCU.

The source driver SRIC may include a readout circuit 10 which senses a touch on a touch sensing panel TSP and converts input values according to the touch into touch sensitivities S_DA as digital values.

The touch sensing panel TSP may be implemented in a capacitive type which senses touch inputs through a plurality of capacitive sensors. For example, the touch sensing panel TSP may include driving lines (not illustrated), read lines Rx1 to Rxi adjacent to the driving lines, and touch sensors (not illustrated) adjacent to the driving lines and the read lines Rx1 to Rxi.

The readout circuit 10 may sequentially sense inputs of sensing areas according to a control signal CS of the controller MCU. For instance, the readout circuit 10 may read currents through the read lines Rx1 to Rxi, and may provide touch sensitivities S_DA, corresponding to the currents, to the controller MCU.

For example, the readout circuit 10 may receive a current of a touch sensor in response to a driving signal from the controller MCU. The readout circuit 10 may sample inputs received from the touch sensors, may accumulate the sampled inputs in the capacitors of integrators, and may convert accumulated values of the capacitors into touch sensitivities as digital values, by using analog-to-digital converters. The readout circuit 10 may provide touch sensitivities S_DA to the controller MCU.

Although not illustrated, the source driver SRIC may include latch circuits which latch image data, digital-to-analog converters which convert the image data into source signals by using grayscale voltages, and output circuits which output the source signals to a display panel.

For example, the source driver SRIC may provide a source signal to the display panel during a display period, and may sequentially sense the sensing areas of the touch sensing panel TSP according to the control signal CS during a touch sensing period.

The controller MCU may receive the touch sensitivities S_DA of the sensing areas from the source driver SRIC. The controller MCU may group and label sensing areas having touch sensitivities equal to or greater than a first reference value among the touch sensitivities S_DA, into groups. For example, the controller MCU may divide regions, expected as touch candidates, into respective groups by using touch sensitivities, and may label the respective groups for identification. The controller MCU may expect regions whose touch sensitivities are equal to or greater than the first reference value, as touch candidates, and may identify the respective groups by allocating a symbol such as a number to each group. The first reference value may be understood as an absolute value.

The controller MCU may determine the validity of touch sensitivities S_DA for each region predicted as a touch candidate, by using touch sensitivities of sensing areas located around a sensing area having a maximum touch sensitivity. The controller MCU may skip the calculation of touch coordinates C_DA when the touch sensitivities S_DA are not valid.

When determining the validity of the touch sensitivities S_DA, the controller MCU may determine that the touch sensitivities S_DA of a corresponding touch are invalid, in the case where at least one of touch sensitivities of sensing areas around a sensing area having a maximum touch sensitivity is equal to or less than a second reference value.

When the touch sensitivities S_DA are determined to be invalid, the controller MCU may ignore the touch sensitivities S_DA of a previous frame, and may determine the validity of touch sensitivities using the touch sensitivities S_DA of a next frame. When it is determined that the touch sensitivities S_DA of the next frame are valid, the controller MCU may calculate touch coordinates C_DA using the touch sensitivities S_DA determined to be valid.

In the case where touch sensitivities S_DA are determined to be invalid in successive frames, the controller MCU may determine that noise is introduced and may change a touch sensing frequency. The touch sensing frequency may be defined as a frequency of a signal driving touch sensors for the sensing areas of the touch sensing panel TSP or a frequency of a driving signal applied to the driving lines to sense a touch.

For example, when determining the validity of the touch sensitivities S_DA, the controller MCU may determine that the touch sensitivities S_DA of a region expected as a touch candidate are invalid, in the case where at least one of touch sensitivities of upper, lower, left and right surrounding sensing areas based on a maximum touch sensitivity MAX of the region expected as the touch candidate has a negative value.

For example, when determining the validity of the touch sensitivities SDA, the controller MCU may determine that the touch sensitivities S_DA of a region expected as a touch candidate are valid, in the case where touch sensitivities of upper, lower, left and right surrounding sensing areas based on a maximum touch sensitivity MAX of the region expected as the touch candidate have positive values.

For instance, the controller MCU may compare the touch sensitivities S_DA with the first reference value, and may expect touch sensitivities equal to or greater than the first reference value, as a touch candidate. The first reference value as a threshold value for determining a touch candidate may be set in the controller MCU.

The controller MCU may calculate the touch coordinates C_DA using valid touch sensitivities, and may provide the touch coordinates C_DA to a host HOST.

While the embodiment illustrates that the controller MCU has, built therein, an algorithm capable of improving the accuracy of touch coordinates and avoiding the influence of noise, it is to be noted that the disclosure is not limited thereto. As another example, an algorithm for determining the validity of touch sensitivities and calculating touch coordinates may be built in the source driver SRIC.

Figure 5:
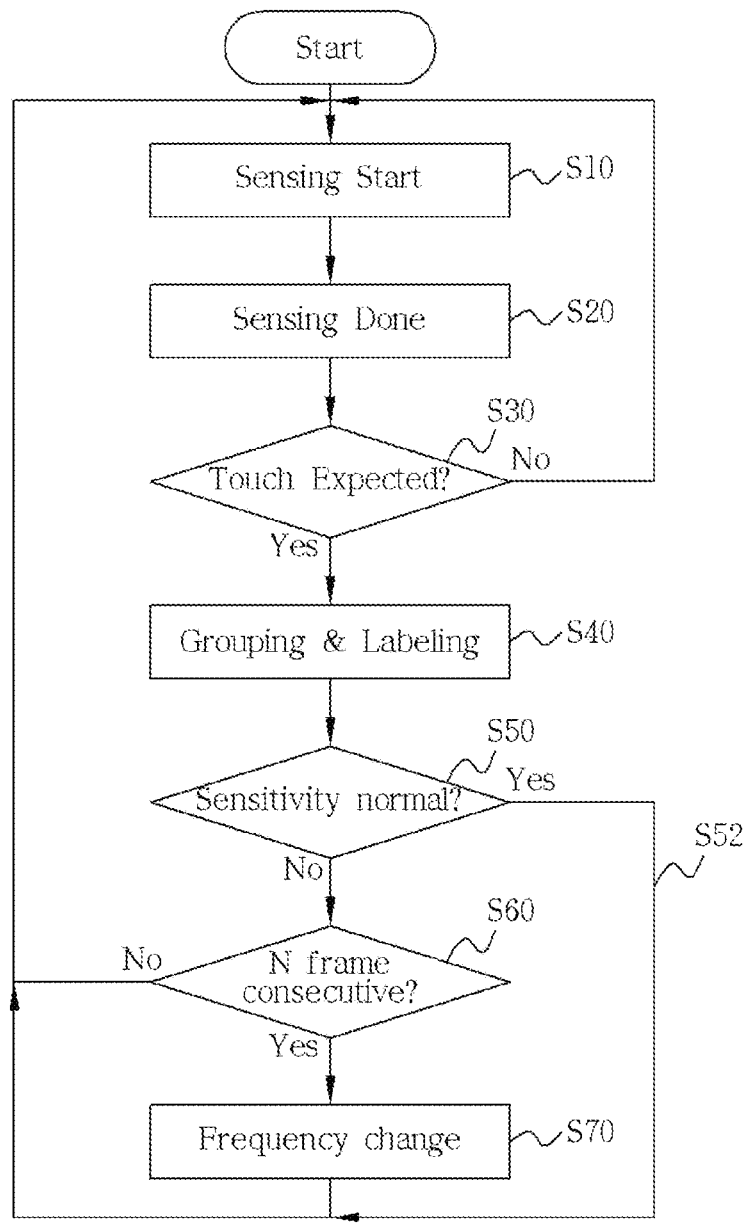
FIG. 5 is a flow chart to assist in the explanation of the touch sensing method in accordance with the embodiment.

FIG. 5 is a flow chart to assist in the explanation of the touch sensing method in accordance with the embodiment.

Referring to FIGS. 4 and 5, the touch sensing device 100 may sense touch sensitivities of sensing areas of a first frame by driving touch sensors of sensing areas of the touch sensing panel TSP (S10) (S20). For example, the touch sensing device 100 may receive touch sensitivities S_DA, corresponding to touch inputs to the sensing areas of the touch sensing panel TSP, from the readout circuit 10. The readout circuit 10 may sequentially sense the touch inputs of the sensing areas according to the control signal CS of the controller MCU.

The touch sensing device 100 may expect sensing areas each having at least the first reference value among the touch sensitivities of the first frame, as a touch candidate (S30). If there are no sensing areas expected as a touch candidate, the touch sensing device 100 may repeat the process (S20) of sensing touch sensitivities of sensing areas by driving (S10) the touch sensors of the sensing areas of the touch sensing panel TSP. For instance, the touch sensing device 100 may compare touch sensitivities with the first reference value, and may expect touch sensitivities equal to or greater than the first reference value, as a touch candidate. The first reference value may be set as a threshold value for determining a touch candidate.

The touch sensing device 100 may group and label touch sensitivities equal to or greater than the first reference value (S40). For example, the touch sensing device 100 may divide sensing areas, expected as touch candidates, into respective groups by using the touch sensitivities, and may label the respective groups for identification. The touch sensing device 100 may expect sensing areas whose touch sensitivities are equal to or greater than the first reference value, as a touch candidate.

The touch sensing device 100 may determine whether the touch sensitivities are valid for each of the groups expected as touch candidates (S50). For example, the touch sensing device 100 may determine the validity of touch sensitivities of sensing areas expected as a touch candidate by using the touch sensitivities of surrounding sensing areas of a sensing area having a maximum touch sensitivity.

In the case where at least one of touch sensitivities of upper, lower, left and right surrounding sensing areas based on a maximum touch sensitivity of a region expected as a touch candidate has a negative value, the touch sensing device 100 may determine that touch sensitivities of corresponding sensing areas are invalid. In the case where touch sensitivities of upper, lower, left and right surrounding sensing areas based on a maximum touch sensitivity of a region expected as a touch candidate have positive values, the touch sensing device 100 may determine that touch sensitivities of corresponding sensing areas are valid.

When touch sensitivities are valid, the touch sensing device 100 may calculate touch coordinates and provide the touch coordinates to the host HOST (S52). The touch sensing device 100 may skip calculation of touch coordinates when touch sensitivities are not valid.

When it is determined that the touch sensitivities of the first frame are invalid, the touch sensing device 100 may check whether touch sensitivities of a second frame are determined to be invalid (S60).

When touch sensitivities are not determined to be invalid in the successive first and second frames, the touch sensing device 100 may return to the steps S10 and S20 of sensing touch sensitivities of sensing areas of the touch sensing panel TSP.

When touch sensitivities are determined to be invalid in the successive first and second frames, the touch sensing device 100 may determine that noise is introduced and change a touch sensing frequency (S70).

Figure 6:
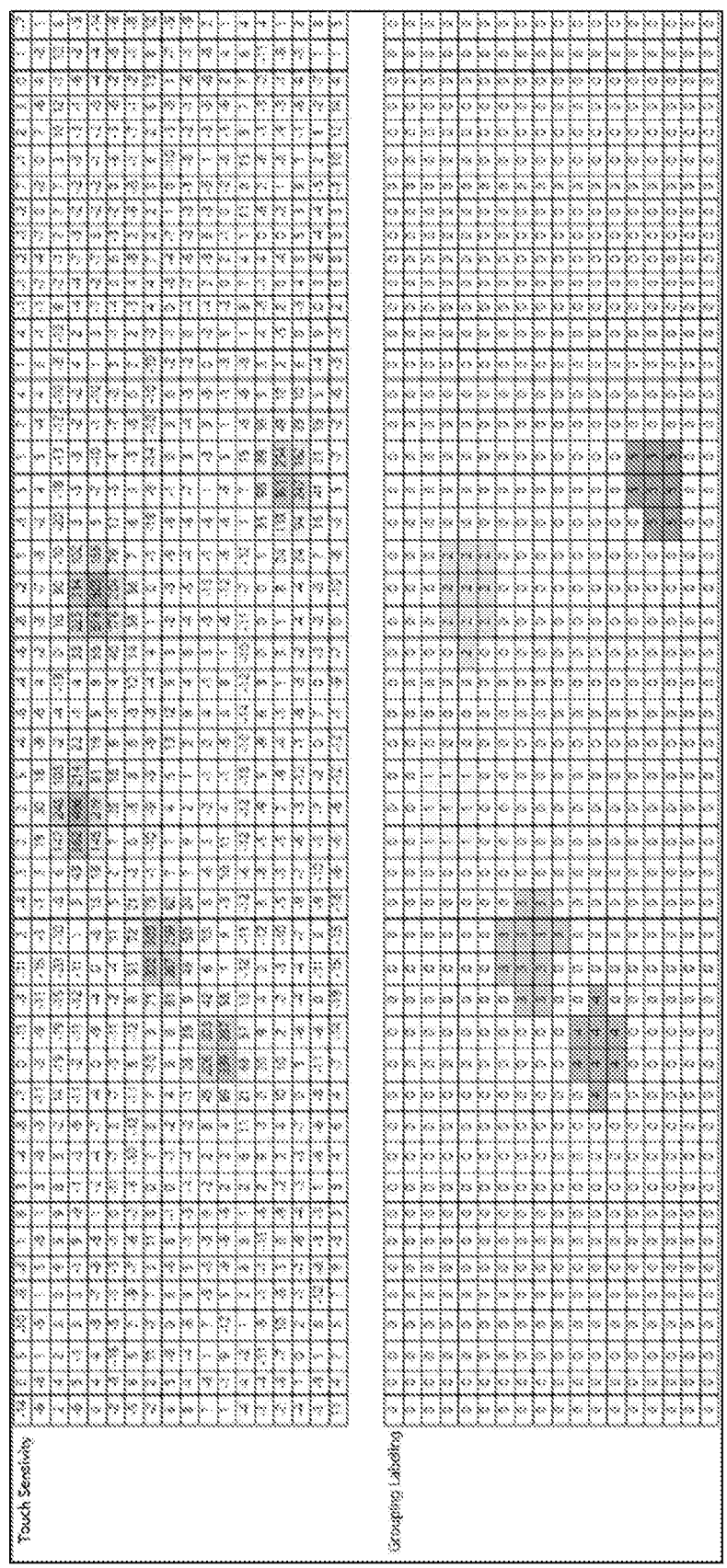
FIG. 6 is a diagram to assist in the explanation of grouping and labeling in the touch sensing method in accordance with the embodiment.

FIG. 6 is a diagram to assist in the explanation of grouping and labeling in the touch sensing method in accordance with the embodiment.

Referring to FIG. 6, the touch sensing device 100 may expect, as a touch candidate, touch sensitivities each having a value of +50 or greater among touch sensitivities, and may group the expected touch sensitivities into a group. In the example of FIG. 6, five groups on the touch sensing panel may be expected as touch candidates.

The touch sensing device 100 may determine the validity of touch sensitivities by checking whether each of the touch sensitivities of upper, lower, left and right surrounding sensing areas based on a sensing area having a maximum touch sensitivity in each of the five groups has a negative value. The touch sensing device 100 may identify the respective groups by allocating numbers 1 to 5 to the five groups, respectively.

In this way, the embodiment may calculate touch coordinates by determining the validity of touch sensitivities. Thus, the accuracy of touch coordinates may be improved even when there is a touch at the boundary between sensing areas.

Also, when touch sensitivities in successive frames are determined to be invalid, the embodiment changes a touch sensing frequency by determining that noise is introduced, and thus, it is possible to avoid an influence by noise.

What is claimed is:

1. A method comprising:
receiving, by a controller, touch sensitivities, wherein the touch sensitivities are converted from values of touch inputs of a touch sensing panel sensed by a readout circuit;
grouping, by the controller, the touch sensitivities being equal to or greater than a first reference value;
labeling, by the controller, each group of the touch sensitivities;
determining, by the controller, validity of the touch sensitivities in each group, by using a maximum touch sensitivity in each group and surrounding the touch sensitivities in each group; and
skipping, by the controller, calculation of touch coordinates when the touch sensitivities of a corresponding group are not valid,
wherein the determining of the validity of touch sensitivities in each group determines that touch sensitivities of the corresponding group are invalid, when at least one of surrounding touch sensitivities of the corresponding group is equal to or less than a second reference value.

2. The method of claim 1, further comprising:
determining the validity of touch sensitivities in each group by using touch sensitivities of a next frame when the touch sensitivities of a current frame are determined to be invalid.

3. The method of claim 2, further comprising:
changing a touch sensing frequency by determining that noise is introduced, when touch sensitivities are determined to be invalid in successive frames.

4. The method of claim 2, further comprising
calculating, when the touch sensitivities are determined to be valid in the next frame, touch coordinates by using the touch sensitivities of the next frame.

5. The method of claim 1, wherein the surrounding touch sensitivities in each group are set as values of touch sensors which are disposed at upper, lower, left and right sides of a touch sensor having the maximum touch sensitivity in the corresponding group.

6. The method of claim 1, wherein the determining of the validity of touch sensitivities in each group determines that touch sensitivities of the corresponding group are invalid, when at least one of surrounding touch sensitivities of the corresponding group has a negative value.

7. The method of claim 6, wherein the determining of the validity of touch sensitivities in each group determines that touch sensitivities of the corresponding group are valid, when surrounding touch sensitivities of the corresponding have positive values.

8. A touch sensing device comprising:
a readout circuit configured to sense touch inputs of a touch sensing panel, and convert values of the touch inputs into touch sensitivities; and
a controller configured to receive the touch sensitivities, group touch sensitivities being equal or to greater than a first reference value, label each group of the touch sensitivities, determine validity of the touch sensitivities in each group by using surrounding touch sensitivities of a maximum touch sensitivity in each group, and skip calculation of touch coordinates when the touch sensitivities of a corresponding group are not valid,
wherein, when determining the validity of the touch sensitivities of the corresponding group, the controller determines that touch sensitivities of the corresponding group are invalid, in the case where at least one of the surrounding touch sensitivities of the corresponding group is equal to or less than a second reference value.

9. The touch sensing device of claim 8, wherein the controller determines the validity of touch sensitivities in each group by using touch sensitivities of a next frame when the touch sensitivities of a current frame are determined to be invalid.

10. The touch sensing device of claim 9, wherein the controller changes a touch sensing frequency by determining that noise is introduced, when the touch sensitivities are determined to be invalid in successive frames.

11. The touch sensing device of claim 9, wherein the controller calculates, when the touch sensitivities are determined to be valid in the next frame, touch coordinates by using the touch sensitivities of the next frame.

12. The touch sensing device of claim 8, wherein the surrounding touch sensitivities in each group are set as values of touch sensors which are disposed at upper, lower, left and right sides of a touch sensor having the maximum touch sensitivity in the corresponding group.

13. The touch sensing device of claim 8, wherein, when determining the validity of the touch sensitivities in each group, the controller determines that touch sensitivities of the corresponding group are invalid, in the case where at least one of the surrounding touch sensitivities of the corresponding group has a negative value.

14. The touch sensing device of claim 13, wherein, when determining the validity of the touch sensitivities in each group, the controller determines that touch sensitivities of the corresponding group are valid, in the case where the surrounding touch sensitivities of the corresponding group have positive values.

* * * * *